Aug. 25, 1942.   J. E. WHITFIELD   2,293,871
PNEUMATIC FEEDER
Filed Dec. 14, 1940   4 Sheets-Sheet 1
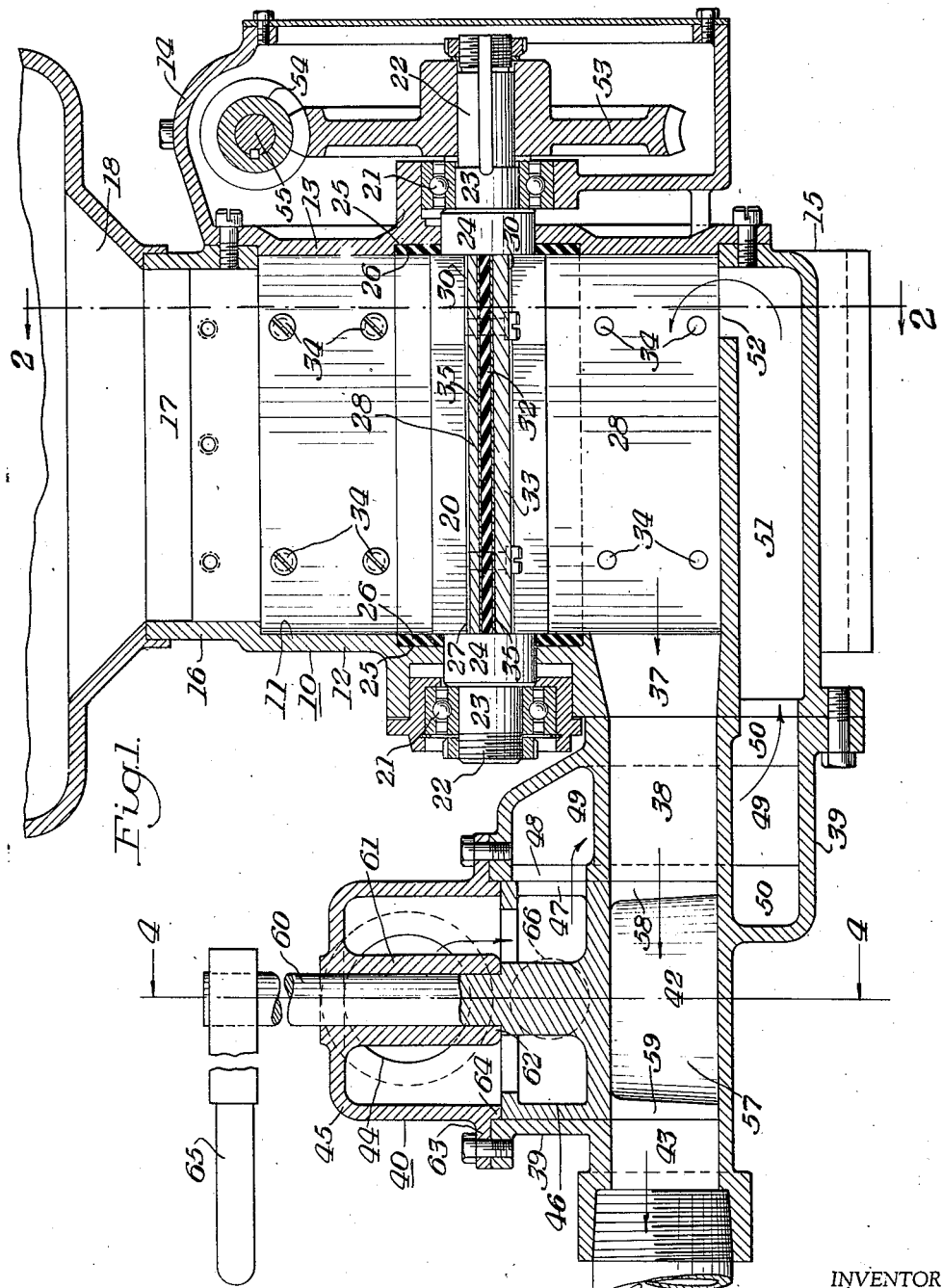
INVENTOR.
Joseph E. Whitfield,
BY Edward A. Lawrence.
his ATTORNEY.

Aug. 25, 1942. J. E. WHITFIELD 2,293,871
PNEUMATIC FEEDER
Filed Dec. 14, 1940 4 Sheets-Sheet 2
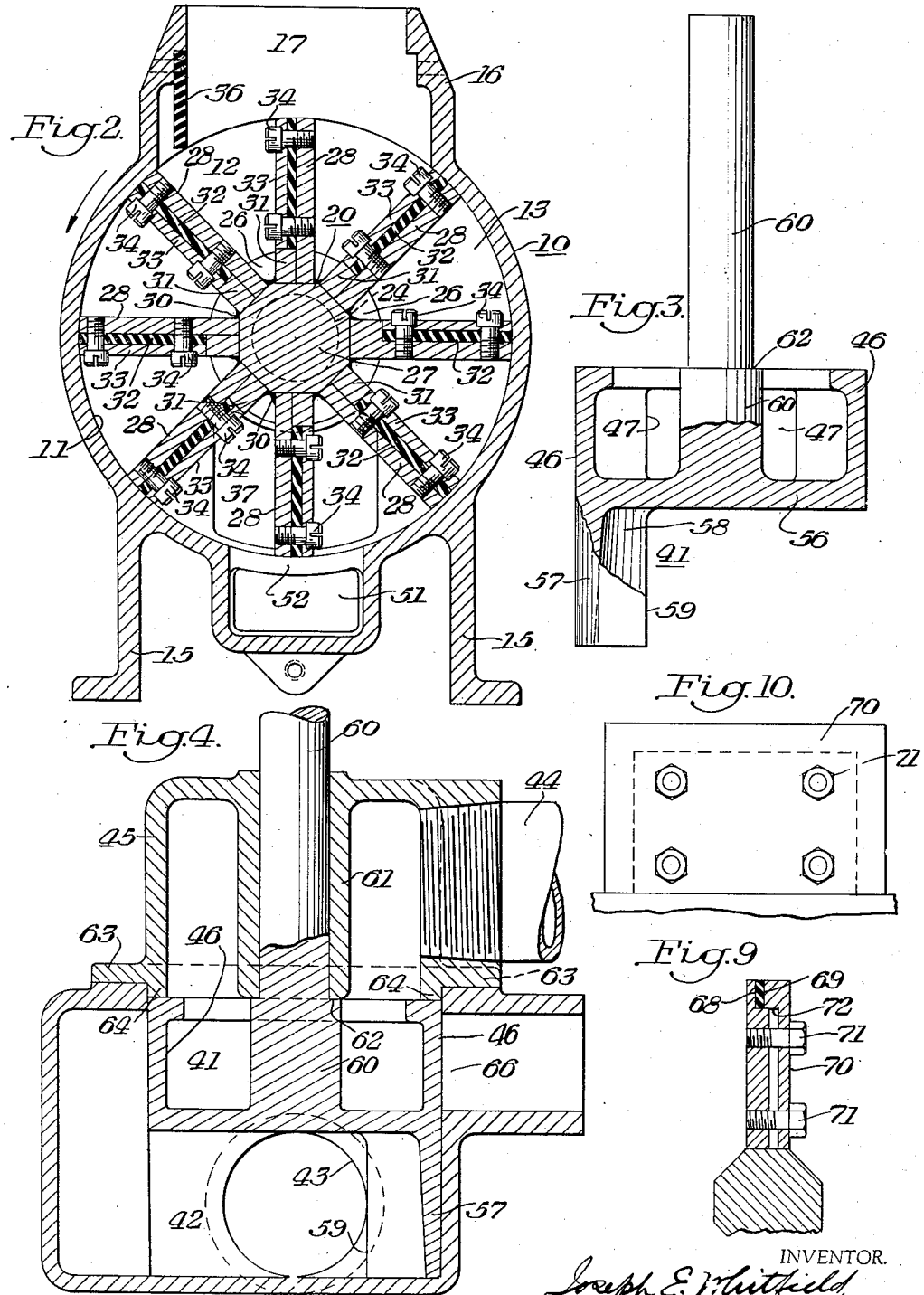
INVENTOR.
Joseph E. Whitfield
BY Edward A. Laurence
ATTORNEY.

Aug. 25, 1942.  J. E. WHITFIELD  2,293,871
PNEUMATIC FEEDER
Filed Dec. 14, 1940  4 Sheets-Sheet 3

INVENTOR.
Joseph E. Whitfield,
BY Edward A. Lawrence
his ATTORNEY.

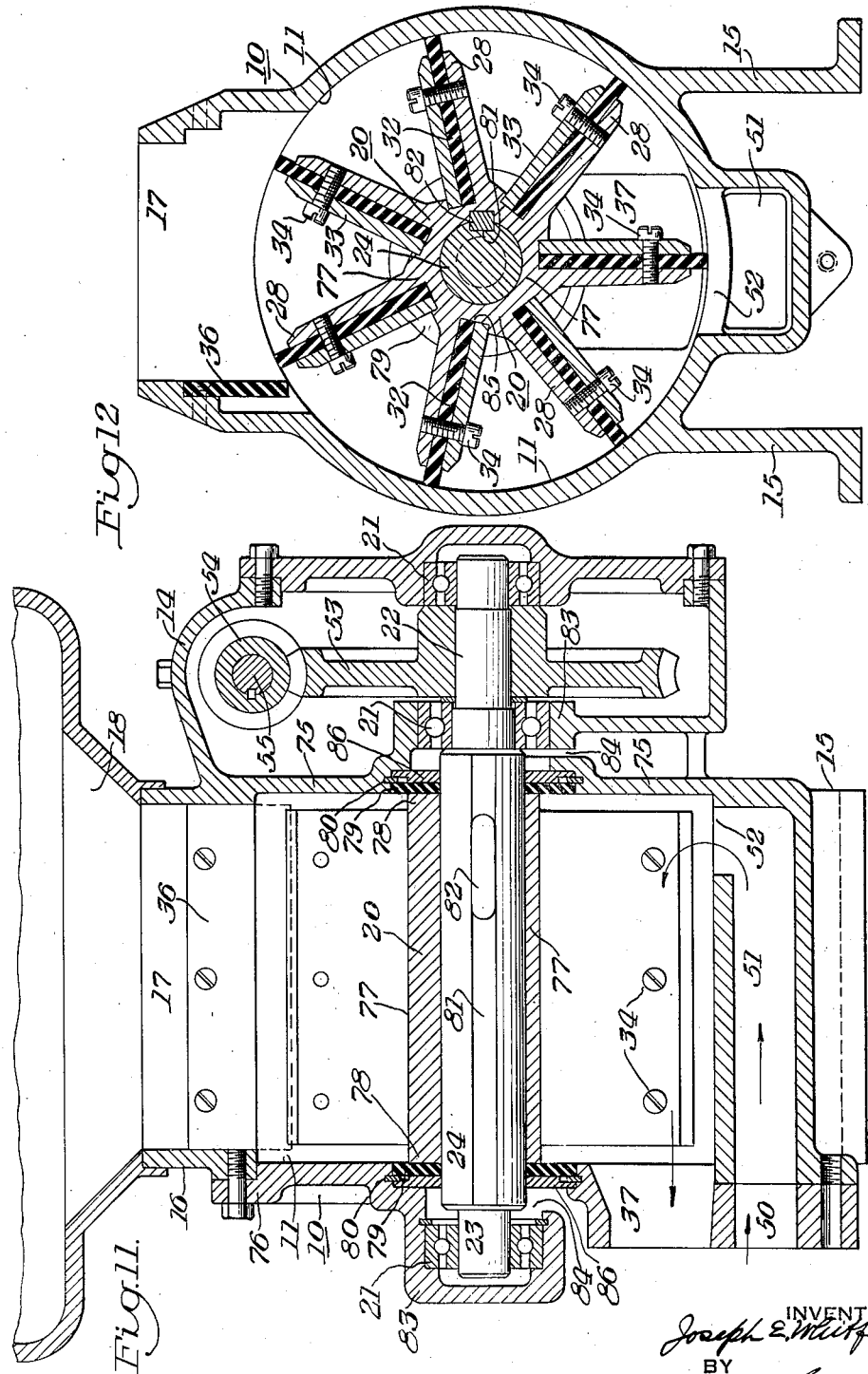

Patented Aug. 25, 1942

2,293,871

UNITED STATES PATENT OFFICE 2,293,871

PNEUMATIC FEEDER

Joseph E. Whitfield, Grove City, Pa., assignor to Edwin J. Fithian, Grove City, Pa.

Application December 14, 1940, Serial No. 370,149

4 Claims. (Cl. 302—49)

This invention relates generally to pneumatic conveyers and more particularly to conveyers wherein the feeder is provided with material-holding pockets which are successively brought into register with the material intake and then with the conveying conduit.

This invention may be advantageously employed for conveying materials such as cereals, rock wool, glass wool and other materials which may be pneumatically conveyed.

Many difficulties arise in blowing materials which are highly abrasive. These materials have a tendency to pack if their movement through the conduit is retarded and they are practically impossible to convey if they absorb moisture. Their density must be maintained substantially uniform and they must be fed to the conduit at a substantially constant rate. If the conveyer is to be shut off it is necessary to clear the conduit or suspend the material by air to prevent it from settling and packing, which would result in frequent clogging of the conduit.

The principal object of this invention is the provision of a pneumatic conveyer which uniformly feeds shredded material at a constant and uniform rate.

Another object is the provision of a pneumatic valve for controlling the flow of air to the conveyer and the control of air and material therefrom.

Another object is the provision of a pneumatic conveyer having an improved feeder arranged with pockets which successively receive the material and are successively brought into registration with the conveying conduit.

Another object is the provision of improved structural parts of the pneumatic conveyer feeder.

Another object of the invention is to provide an effective sealing arrangement which is easily adjusted.

Another object of the invention is to simplify the completed blowing machine by incorporating the speed reducing unit in the feeder, thus eliminating one separate unit.

Other objects and advantages appear in detail in the following description and claims.

In the accompanying drawings a selected practical embodiment is shown for illustrating the principles of this invention wherein:

Fig. 1 is a vertical section of the pneumatic conveyer and the control valve which regulates the admission of air thereto and the discharge of air and material therefrom, the valve being shown in normal operating position.

Fig. 2 is a vertical section taken along the line 2—2 of Fig. 1.

Fig. 3 is an enlarged sectional view of the valve plug.

Fig. 4 is a vertical section of the valve taken along the line 4—4 of Fig. 1, showing the position of the plug.

Fig. 9 is a detail partly in section showing a modified form of packing for the feeder blades.

Fig. 10 is a face view of the structure shown in Fig. 9.

Fig. 11 is a vertical section of a modified form of the pneumatic conveyor taken along the axis of the rotary member.

Fig. 12 is a vertical section taken transversely through the pneumatic conveyor shown in Fig. 11.

Figure 5:
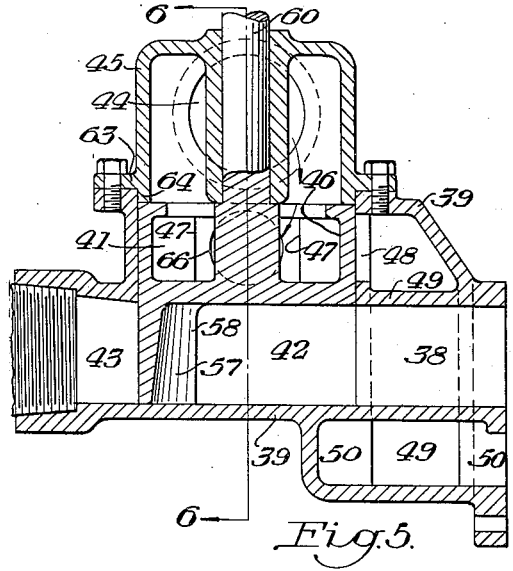
Fig. 5 is a vertical section of the valve shown in Fig. 1 with the plug set to exhaust the air and seal air in the hose.

Referring to the drawings, the conveyer is made up of a horizontally disposed cylindrical casting 10 having a chamber 11 closed at one end by the integral circular head 12 and the other end by the removable circular head 13 which also forms the inner closure wall of the gear housing 14. The bottom side of the cylindrical casing 10 is provided with the depending legs 15 for supporting the same and the top side has an upwardly extending neck 16 with an open throat 17, which extends substantially the full length of the casting between the two heads, and is arranged to be connected to a suitable hopper or feeding table, as indicated at 18.

The feeder or paddle wheel 20 is rotatably supported within the cylindrical chamber 11 by the axially aligned bearings 21 mounted in the heads 12 and 13. This paddle wheel is fabricated on the shaft 22 which has spaced cylindrical surfaces 23 for receiving the inner races of the bearings 21. The diameter of the shaft is enlarged inwardly adjacent the surfaces 23 as indicated at 24, which snugly fits the aligned openings in the heads 12 and 13. An annular recess 25 is provided on the inner face of each head disposed concentric to the openings for receiving the annular packing members 26 which are preferably made of resilient material, such as rubber. This packing is arranged to seal against the cylindrical surfaces 24 and against the ends of the octagonal section 27 of the shaft which extends therebetween. The diameter of the intermediate octagonal section 27 of the shaft 22 is larger than the diameter of the cylindrical surfaces 24 as shown in Fig. 2.

The radially disposed blades 28 of the paddle wheel extend the full length of the chamber 11 and the octagonal section 27 of the shaft. Two of the blades have been cut off in Fig. 1 to simplify the showing of the structure. These blades form pockets arranged to receive material from the throat 17 and carry it around the chamber. The inner end or base of each blade is substantially as thick as the width of octagonal surfaces, leaving only enough space for welding the blades to the shaft and to each other as indicated at 30 in Fig. 2.

Immediately beyond the full diameter of the packing 26 each blade is provided with an offset shoulder 31 which is preferably substantially as wide as one-half the thickness of the blade at its base. A rectangular resilient packing 32, which is preferably the same size as the outer portion of the blade, is placed on the shoulder 31 and secured to the blade by the clamping plate 33 of the same size and the tap bolts 34. The outer edge of the blades and the clamping plates are shaped to conform to the cylindrical surface of the chamber 11.

The resilient packing 32 is preferably formed of a soft rubber sheet of appreciable thickness so that when mounted with the clamping plate 33 on the blade the assembly is approximately the same thickness as the base of the blade.

The purpose of employing a soft resilient packing 32 is to produce a sealing action against the heads and the cylindrical wall of the chamber 11. If the surfaces of the blade and clamping plate adjacent the packing are smooth and they are lubricated before being clamped, the soft resilient packing will flow outwardly and seal against the cylindrical surface and the heads forming chamber 11. The packing material must be such that when subjected to pressure it will flow. If the surfaces of the blade and the clamping plate are highly polished the packing may readily flow without the aid of lubrication. If soft rubber plates are used as a packing, a graphite or grease has been found suitable for lubricating purposes.

To avoid finishing the surfaces of the blades and the clamping plates it has been found practical to employ tin face plates 35 on each side of the packing, as indicated in Fig. 1. The tin being thin and smooth readily induces flowing of the rubber packing when slightly lubricated. This practice provides a considerable saving in eliminating the steps of machining or grinding the blades and the clamping plates and forms an important improvement in this structure.

The paddle wheel may be revolved in either direction. However if it is rotated in a counterclockwise direction in Fig. 2 a resilient wiping skirt or brush 36 is mounted on the left side of the throat 17 so that it will engage the outer edges of the blades as they are about to pass into engagement with the cylindrical wall of the chamber 11. This keeps the edges of the blades clean and reduces abrasion caused by material collecting thereon. A shoulder is provided along the right side of the throat 17 for the skirt or brush 36 if the paddle wheel is to be rotated in the opposite direction.

The lower portion of the head 12 is provided with the port 37 which is connected to the duct 38 in the valve casing 39 of the air control valve 40. When the valve plug 41 is positioned as indicated in Fig. 1 the duct 38 is open through the lower valve chamber 42 to the pneumatic conduit connection 43. The air is supplied through the passageway 44 in the bonnet 45 and travels down into the chamber defined by the cylindrical wall portion 46, which is open at the top, of the valve 41, and out through the valve port 47, to the casing port 48 where it may divide and travel down through the twin ducts 49 which straddle the duct 38 and meet in a common chamber 50. The air then continues to flow from the chamber 50 to the duct 51 along the bottom of the casing 10 and is discharged into the right end of the chamber 11 through the ports 52 where it picks up the material carried in the pockets between the blades of the paddle wheel and discharges it out through the valve to the pneumatic conduit.

The introduction of the compressed air at the bottom and to one end of the chamber 11 is extremely important when handling fibrous insulating material such as rock wool. The air being introduced in this manner lifts the material and carries it longitudinally of the paddle wheel and out through the valve. Once the material in the end of the pocket is lifted and started in motion it is readily carried out of the chamber. The seals 26 and 32 prevent the air from escaping to the feeding throat 17.

The discharge port 37 of the chamber 11 in the head 12 is constructed to register with each successive pocket between the blades of the paddle wheel before and after these pockets register with the air introducing port 52. Thus the discharge port is always open longer than the inlet port at any position of the moving pocket. This is novel and is advantageous when handling material such as rock wool.

The paddle wheel may be rotated at a speed of approximately thirty revolutions per minute when conveying insulating material. If the material has been previously shredded and is fed by hand to the machine this speed provides ample time for filling the pockets as they pass the open throat. These pockets have a fixed capacity and the skirt or brush 36 prevents them from becoming overfilled.

The paddle wheel may be driven by any suitable source of rotary power. As shown in Fig. 1 the shaft 22 extends into the gear casing 14 and has the worm gear 53 keyed thereto. This gear is driven by the worm 54 secured to the rotary shaft 55 which extends out of the casing where it is connected to the source of rotary power. The casing 14 encloses these gears and prevents any abrasive particles from entering.

When the conveyer is in operation the valve plug 41 is set as shown in Figs. 1 and 4 and directs the air to the chamber 11 where it picks up the material in the pockets of the paddle wheel and conveys it through the valve to the pneumatic conduit secured to the discharge 43 of the valve. The valve plug 41 illustrated in Fig. 3 comprises the cylindrical wall portion 46 which is closed at the bottom by the floor 56 and open at the top and has a single port 47. A depending arcuate skirt 57 is formed integral with the cylindrical wall portion 46 and provides a continuous perimetrical surface thereof for the full extension of the skirt. The vertical edge 58 of this skirt lies in the same vertical plane as one edge of the port 47. The other edge 59 of the skirt is disposed in the same plane which forms the chord of the arcuate flange.

The valve plug stem 60 is preferably formed integral with the floor 56 and extends upwardly through the opening of the cylindrical wall portion 46 and is disposed coaxially therewith. The valve bonnet 45 is provided with a depending integral sleeve 61 which is arranged to slide down over the upper portion of the stem and engage the shoulder 62. The bonnet is provided with a radial flange 63 arranged to be secured to the valve casing 39 and an axial flange 64 which engages the upper annular edge of the cylindrical wall portion 46. Thus the sleeve of the bonnet holds the valve plug in its proper position within the casing. The lower edge of the flange 57 rides on the floor of the chamber 42 and supports the valve plug. The valve stem 60 extends above the valve bonnet 45 and is provided with a suitable handle 65 for rotating the valve plug as illustrated in Fig. 1.

Figure 6:
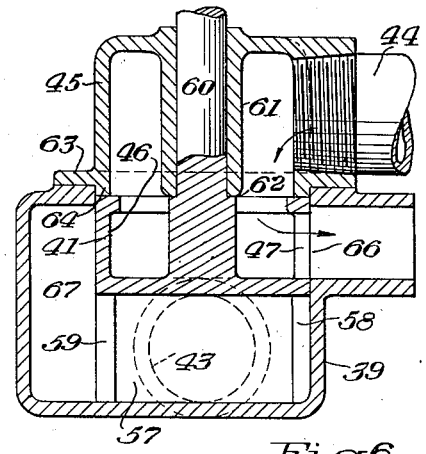
Fig. 6 is a vertical section taken along the line 6—6 of Fig. 5.

The valve casing 39 is provided with the exhaust port 66 which may be connected with a conduit or exhaust directly to the atmosphere. The port 66 may be aligned with the port 47 of the valve plug as shown in Figs. 5 and 6. The port 66 is disposed at 90° from the port 48. Thus when the valve plug is positioned as illustrated in Figs. 5 and 6 the air travels from the source of supply through the passageway 44 into the bonnet, down into the cylindrical wall portion 46 and out through the ports 47 and 66 to atmosphere. At this time the port 48 is closed by the cylindrical wall and the depending flange 57 of the valve plug closes the pneumatic conduit 43. By sealing the conduit in this manner the air is retained therein. The material will then be prevented from flowing back through the conduit to the machine, which action may cause it to pack tightly in the conduit, making it difficult to blow out. This is especially true if the pneumatic conduit is vertically disposed along any portion of its length.

Figure 7:
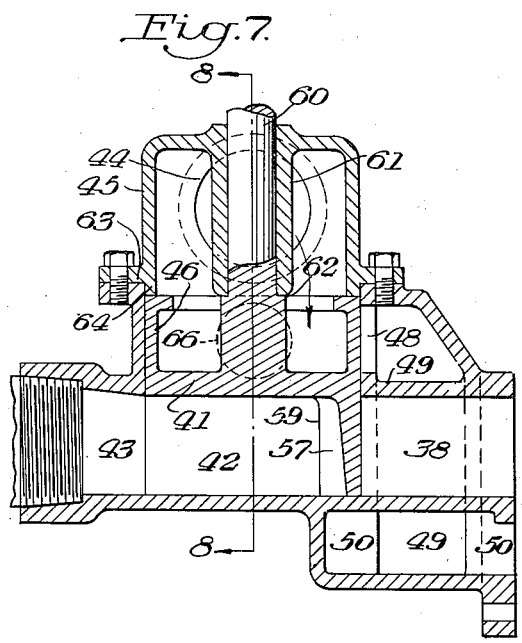
Fig. 7 is a vertical section of the valve shown in Fig. 1 with the plug set to conduct air directly to the hose.
Figure 8:
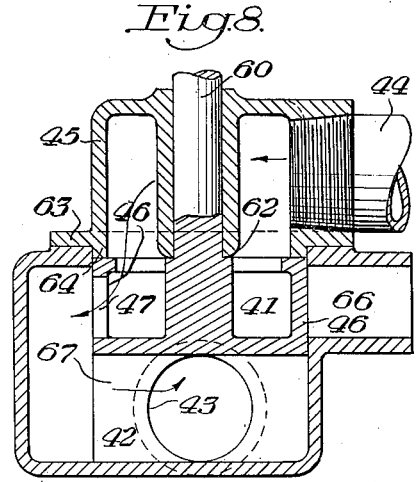
Fig. 8 is a vertical section taken along the line 8—8 of Fig. 7.

The third position of the valve plug 41 is illustrated in Figs. 7 and 8. In this position the valve is disposed at 180° from that illustrated in Figs. 5 and 6 and the port 47 opens into the valve bypass duct 67 and the air then travels through the inlet 44, the bonnet 45, down through the cylindrical wall portion 46, the port 47, the bypass duct 67, into the chamber 42 and is discharged through 43 to the pneumatic conduit. The air thus by-passes the paddle wheel and cleans out any material left in the conduit. When blowing insulating material this is referred to as blowing out the hose. The cylindrical wall portion 46 and depending arcuate flange 57 of the valve plug close all the connections leading to the casing 10. Thus the paddle merely revolves, carrying the material around in the pockets. If any material falls into the ports 37 and 52 it is the first to be removed when the air is again circulated through the chamber 11. A clutch, switch or other suitable means may be provided to stop the rotation of the paddle wheel when the valve plug is not in the position shown in Figs. 1 and 4. If the source of power provides the air under pressure as well as rotating the paddle wheel, then it is advisable to have a clutch means for independently disconnecting the driving connection of the paddle wheel.

When the valve plug is placed in the position diametrically opposite to that shown in Figs. 1 and 4, the ports 48 and 66 will be shut off, thus blocking any passage of air and the passageway from the chamber 11 through the valve chamber 42 to the pneumatic conduit will be open. This position has no function other than blocking the passage of air from entering any part of the system.

In Figs. 9 and 10 I show a modified form of blade structure for the conveyer. In this instance the blade is approximately one-half as thick as the width of the octagonal surfaces of the shaft, and it is provided along its outer perimetrical edge and also along its lateral or radial edges with a recess 68 of rectangular cross section which provides a seat of the contour of three sides of a rectangle, in which seat is received a similarly shaped rubber gasket or packing 69 which is clamped in place by means of the face plate 70 bolted as at 71 to the blade and provided with a rib 72 of the same contour as the packing, which rib compresses the packing against the face of the blade.

This arrangement provides an even flow of the packing relative to the end and side edges of the blade and thus produces a sealing effect which is uniform throughout the entire extent of the packing.

In the modification shown in Figs. 11 and 12 the chamber 11 formed by the cylindrical casting 10 is closed at the opposite or right end by the integral head 75 which also forms the inner closure wall of the gear housing 14 and the left end is closed by the removable circular head 76. It will be noted that in this structure the integral and removable heads have been reversed from that shown in Fig. 1.

The object of changing the removable head from one end of the casing to the other is to provide quick access to the chamber 11 for adjusting or replacing the resilient blade packing members.

To further facilitate the adjustment and removal of these resilient blade packing elements the feeder or paddle wheel 20 is cast in one integral piece having a cylindrical portion 77 with radially extending blades 28 formed integral therewith. These blades do not extend to the inner cylindrical surface of the chamber 11 but stop short, leaving a considerable clearance therebetween, as shown in Fig. 12. The blades are also spaced from the side walls 75 and 76 as shown in Fig. 11.

The cylindrical portion 77 extends axially at both ends, as shown at 78, and has a rotary engagement with the sealing rings 79 which are locked in place by the expanding split locking rings 80. A keyway 81 is provided in the bore of the cylindrical portion 77 and is arranged to slide over the key 82 fixed to the enlarged portion 24 of the shaft.

The shaft bearings 21 are supported in the housing 83 formed integral with the cylinder ends 75 and 76. It will be noted that these housings are open on their underside as indicated at 84 to permit any particles to escape which have found their way out between the extended ends 78 of the paddle and the sealing ring 79.

With this construction the valve 40 may be readily unfastened from the casing of the conveyor and the head 76 may then be removed. The bolts 34 can be tightened or loosened while the paddle wheel is within the chamber and the adjustment can thus be visually checked. When the head 76 has been removed the paddle wheel may be readily withdrawn from the chamber 11 for replacing the resilient plates 32 or the whole paddle wheel may be withdrawn, turned around and again inserted end for end if the wear on the rubber plates 32 is greater on one end than it is on the other. While making these adjustments or replacements the shaft and motor connections remain undisturbed.

The inner clamping bolts 34 have been eliminated in the structure shown in Figs. 11 and 12 by providing the longitudinal grooves or sockets in the perimetral surface of the cylindrical portion 77 adjacent the inner portion of the radially extending blades 28. These sockets are shown at 85 in Fig. 12. They extend for the full length of the cylindrical portion 77 permitting the rubber sealing plates to engage the walls 75 and 76.

The shaft shown in Fig. 11 is provided with a bearing 21 on each side of the worm gear 53. Thus when the removable end 76 is withdrawn from the casing to permit adjustment of the rubber plates on the paddle wheel 20 or to remove the paddle wheel therefrom, the shaft remains fully supported by these two bearings in the gear housing.

The sealing rings 79 may be made of metal but are preferably made of rubber and are mounted in their respective heads 75 and 76 before the structure is assembled. A backup plate or ring 86 is placed on a concentric seat in each head and is held in place by the split locking ring 80. The backup plates have shoulders which provide sufficient clearance for springing the split rings 80 inwardly towards the shaft, permitting their removal from the seats in the heads 75 and 76.

I claim:

1. In a pneumatic conveyer system, the combination of a cylindrical casing having an opening in its wall for the introduction of material, an air inlet port and a discharge port adjacent the opposite ends of the casing and remote from the opening, a member mounted for rotation in the casing and comprising an annular series of pockets arranged to be brought in turn into registration with the opening for loading and into registration with both the ports for the pneumatic discharge of their contents, a discharge conduit, a multiple port valve casing interposed between the discharge port and the conduit and connected to the air inlet port and also to a supply of air under pressure, and a valve member movable in the valve casing and arranged when in one position to supply air to the inlet port to be discharged through the outlet port, through the valve casing and through the conduit, and when in another position to cut off the air from the inlet port and from the conduit.

2. In a pneumatic conveyer system, the combination of a cylindrical casing having an opening in its wall for the introduction of material, an air inlet port and a discharge port adjacent the opposite ends of the casing and remote from the opening, a member mounted for rotation in the casing and comprising an annular series of pockets arranged to be brought in turn into registration with the opening for loading and into registration with both the ports for the pneumatic discharge of their contents, a discharge conduit, a multiple port valve casing interposed between the discharge port and the conduit and connected to the air inlet port and also to a supply of air under pressure, and a valve member movable in the valve casing and arranged when in one position to supply air to the inlet port to be discharged through the outlet port, through the valve casing and through the conduit, when in another position cut off the air from the inlet port and from the conduit, and when in a third position to cut off the air from the inlet port and to discharge it through the conduit for cleaning the material from the same.

3. In a multiport valve for controlling the operation of a pneumatic conveyer, the combination of a casing having a vertically disposed cylindrical valve chamber with a closed bottom and open at its upper end, the lower section of said chamber having aligned ports for the passage of material through the valve and a by-pass port disposed at right angles thereto, the upper section of said chamber having three ports, one port connected to the conveyer, the second port connected through the by-pass to the lower section of the valve chamber, and the third port connected to atmosphere, a bonnet arranged to be mounted on the top of the casing to close the upper end of said chamber and be connected to a supply of air under pressure, a bearing in said bonnet aligned axially of said chamber, and a valve member mounted in said chamber and having its stem journaled in said bearing, said valve being provided with ports arranged when the valve is in one position to connect the aligned ports in the lower section of the chamber and open the conveyer port to the interior of the bonnet, and when in another position to close the aligned port connected to the conveyer while directing air through the by-pass to the other aligned port, and when in the third position to connect the bonnet with the port connected to atmosphere.

4. In a pneumatic conveyer, the combination of a horizontally disposed cylindrical casing closed at both ends, an opening through the top of the perimetral wall for the introduction of material into the casing, a member arranged for rotation in the casing and having an annular series of radially disposed blades defining pockets therebetween, a discharge port in the lower portion of one of the end walls, and an air inlet port in the bottom of the casing, the pockets of the member being brought in turn into registration with said opening at the top of the casing for loading and into registration with both of said ports for lifting and pneumatically conveying their contents through the discharge port.

JOSEPH E. WHITFIELD.